Patented June 19, 1945

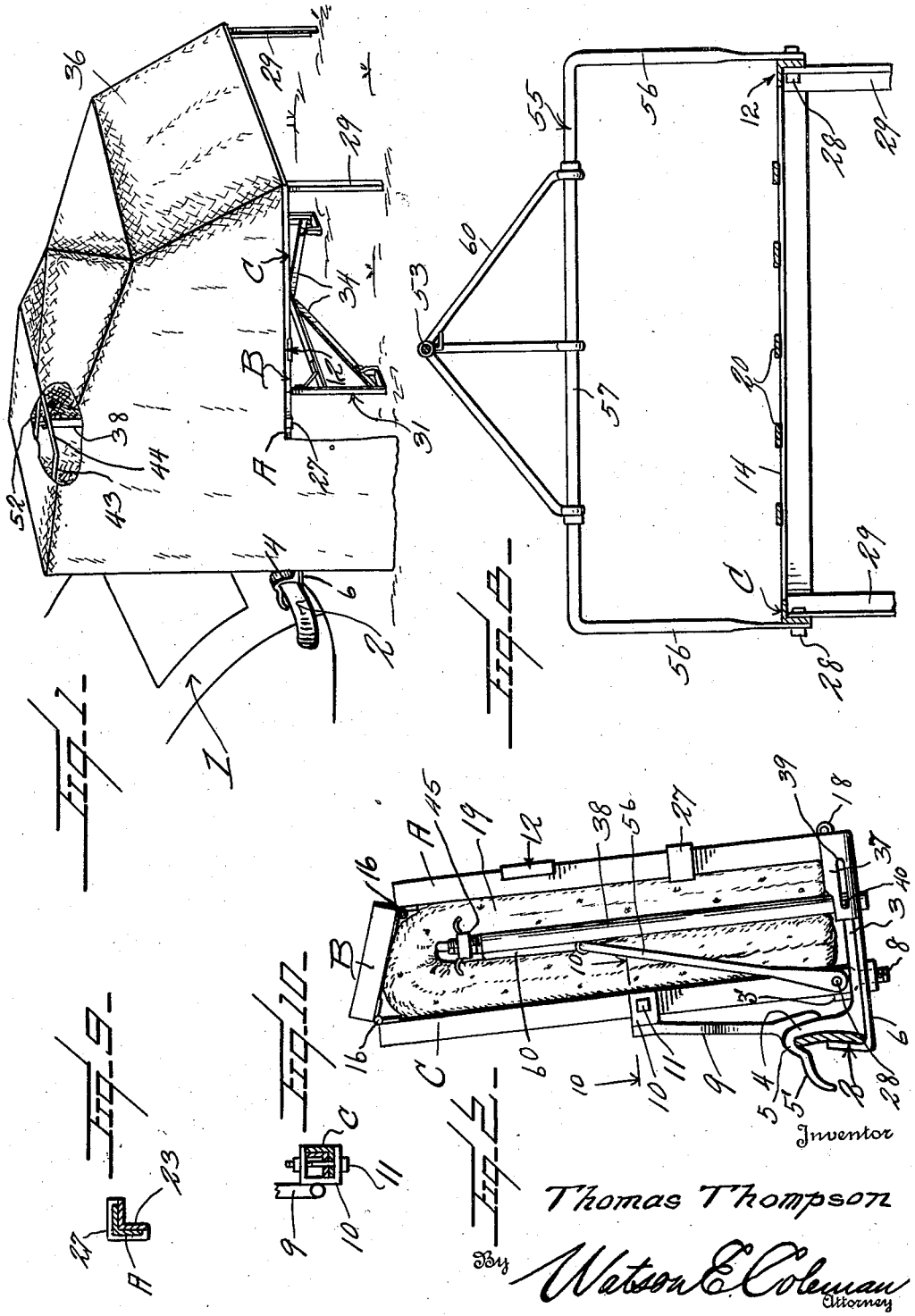

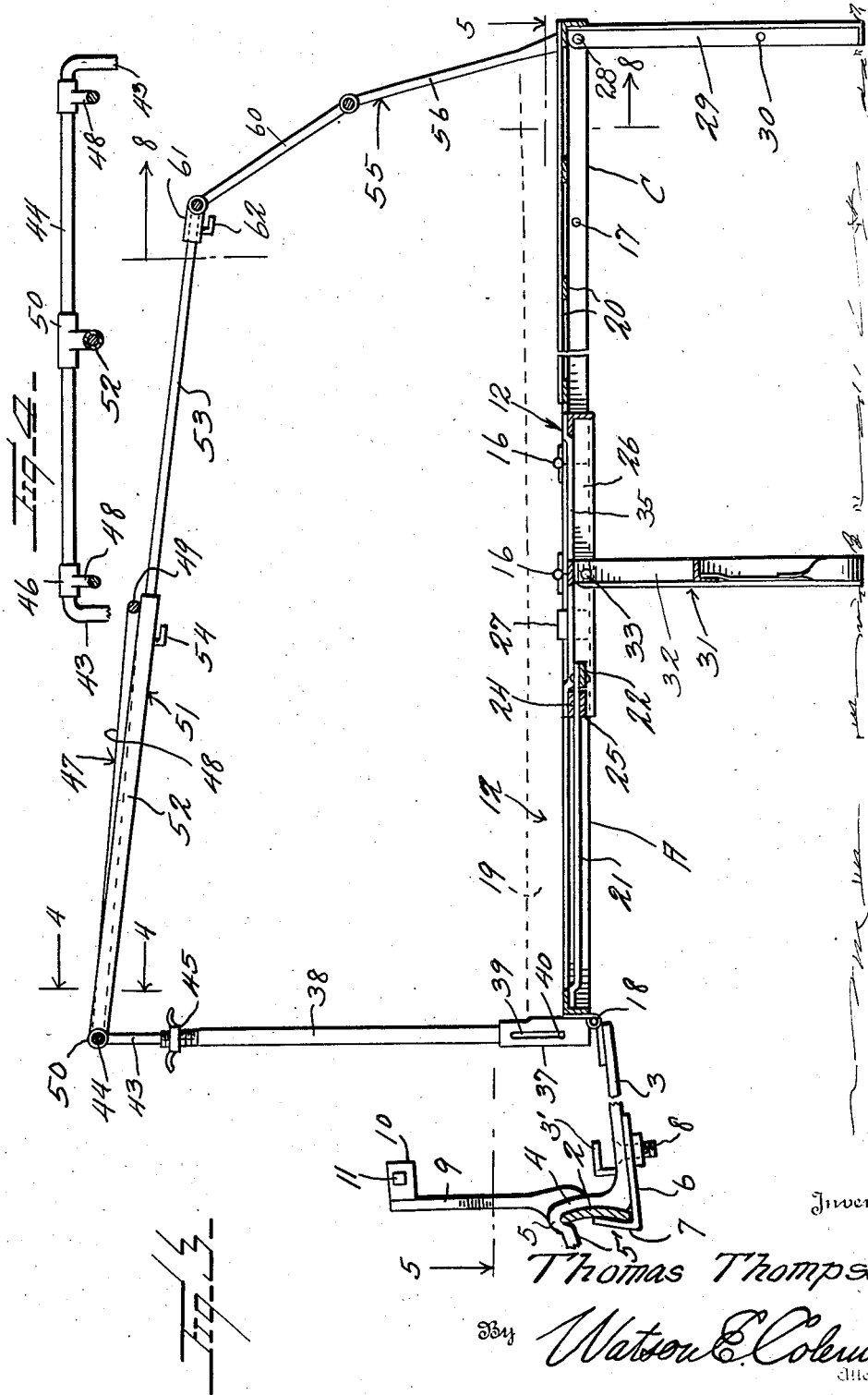

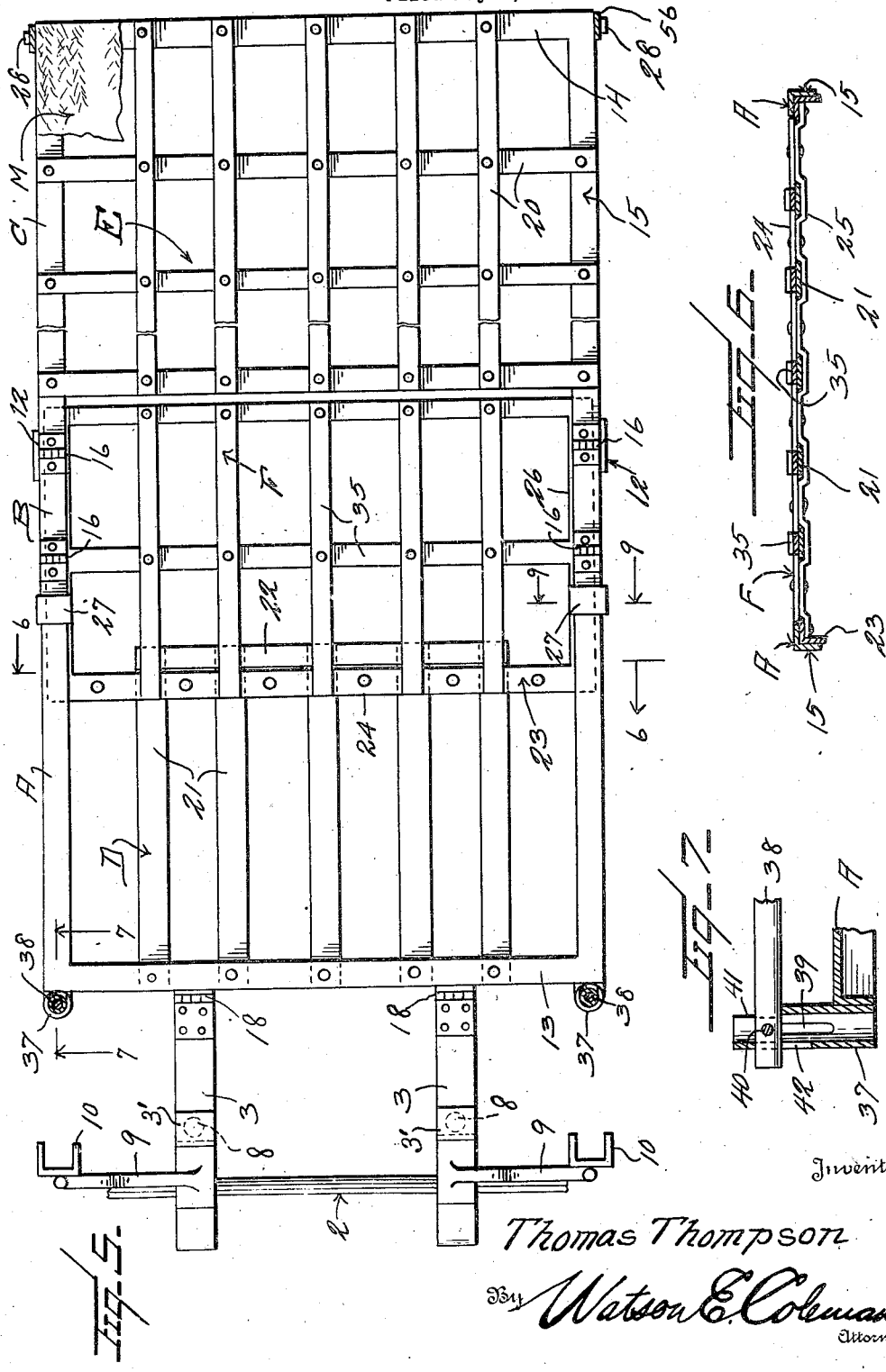

2,378,448

UNITED STATES PATENT OFFICE 2,378,448

FOLDABLE VEHICLE TENT AND BED

Thomas Thompson, Bothell, Wash.

Application May 4, 1944, Serial No. 534,070

8 Claims. (Cl. 5—119)

This invention relates generally to improvements in folding camp beds and pertains more particularly to a folding vehicle bed.

The primary object of the present invention is to provide a foldable bed structure which is so constructed that it may be attached to a motor vehicle bumper so that such bumper will function as a supporting means for an end of the bed and also as a carrier for the bed when the latter is folded.

Another object of the invention is to provide a foldable motor vehicle bed wherein the bed frame is constructed in a novel manner which facilitates the folding thereof in a compact unit which can be readily disposed upon supporting arms attached to the motor vehicle rear bumper so that such bumper will serve as a carrying means for the bed structure, the foldable frame further being designed so as to form an encasing frame-work for the bed mattress and bedclothes, in which frame-work the mattress and bedclothes are folded up simultaneously with the folding of the bed frame.

Still another object of the invention is to provide a foldable motor vehicle bed structure in which the frame is formed in three connected parts which facilitate the ready folding up of the frame, and in which a novel means is provided for reinforcing the frame when such parts are unfolded to lie in a common plane, so that a strong and comfortable bed frame structure will be obtained.

A still further object is to provide a foldable motor vehicle bed which has combined therewith a collapsible overlying frame-work designed to function as a canopy support whereby said bed when set up with the overlying framework and canopy support becomes a combined bed and shelter.

Still another object is to provide a foldable motor vehicle bed structure in which a novel means is provided for coupling the head end of the structure with a motor vehicle bumper whereby such head end will be steadily supported when the bed is unfolded or set up for use and whereby a strong and safe means is provided, when the bed is folded, for supporting the folded bed structure at the rear of the motor vehicle and upon the rear bumper thereof.

The invention will be best understood from a consideration of the following detailed description taken in connection with the accompanying drawings forming part of this specification, with the understanding, however, that the invention is not to be confined to any strict conformity with the showing of the drawings but may be changed or modified so long as such changes or modifications mark no material departure from the salient features of the invention as expressed in the appended claims.

In the drawings:

Fig. 1 is a view in perspective of the foldable bed and tent structure of the present invention set up for use and showing a portion of the rear of a motor vehicle with which the head end of the bed frame is connected, a part of the tent or canopy being broken away.

Fig. 2 is a view in side elevation of the bed structure or bed frame folded up and supported for transportation upon the rear bumper of the motor vehicle.

Fig. 3 is a view in vertical longitudinal section of the bed frame structure and canopy frame set up for use.

Fig. 4 is a sectional view on the line 4—4 of Fig. 3.

Fig. 5 is a horizontal section on the line 5—5 of Fig. 3, the bracing arms and saddles being, however, in top plan.

Fig. 6 is a transverse section on the line 6—6 of Fig. 5.

Fig. 7 is a sectional view on the line 7—7 of Fig. 5, showing the corner post in lowered position.

Fig. 8 is a vertical transverse section through the foot end of the bed frame and canopy frame taken on the line 8—8 of Fig. 3.

Fig. 9 is a sectional view on the line 9—9 of Fig. 5.

Fig. 10 is a sectional view on the line 10—10 of Fig. 2.

Referring now more particularly to the drawings, the numeral 1 in Fig. 1 indicates generally the rear end of a motor vehicle to which is attached the usual or conventional rear bumper bar 2, which bumper bar serves as a supporting means for the foldable vehicle bed and tent structure of the present invention.

In accordance with the present invention there are provided a pair of support bars 3, each of which at one end is provided with a laterally extending slightly arcuate or longitudinally curved head 4 which terminates in a short reversely bent bill 5 under which is engaged the top edge of the motor vehicle bumper 2, the bumper fitting against the curved face of the head 4. The bill is continued laterally downwardly away from the head 4 to provide a handling member or extension 5'. These bars 3 have secured to the under faces thereof adjacent the forward ends, a restraining bar 6 which terminates in the angular extension 7. Each of these bars 6 passes across the lower edge of the bumper and the angled end 7 extends upwardly between the free end of the hook 5 and the forward face of the bumper, so that it will be readily seen that the bumper is securely held and the bar 3 cannot shift either transversely of the vehicle on the bumper or up and down on the bumper. The restraining bars 6 are secured to the main bed supporting and attaching bars 3 by the bolts 8, the heads of which are countersunk, as shown. There is thus formed at the forward end of each of the attaching bars 3, a bumper claw which is easily and quickly hooked over the bumper and firmly secured thereto so as to extend rearwardly and at a slight upward elevation for the support of the bed frame hereinafter described, as is illustrated in Figs. 2 and 3.

Each of the supporting and attaching bars 3 has connected therewith, preferably at the head 4, the upwardly and laterally extending brace arm 9 which upon its upper end supports a rearwardly facing saddle 10 which forms a vertical receiver for a portion of the folded bed frame. Each of these saddles has the spaced side members thereof provided with suitable openings for the reception of a securing bolt 11 which extends transversely through the saddle and also through a side bar of a portion of the bed frame when the latter is in folded condition as shown in Fig. 2, and as hereinafter more specifically described.

The bed frame of the present invention is indicated generally by the numeral 12 and this bed frame is of the usual rectangular design having the transverse head bar 13, the transverse foot bar 14 and the parallel side bars 15. The side bars of the bed frame are divided into the three portions A, B, and C, and the portions B form inserts between the portions A and C and are hingedly connected with these portions A and C by the hinges 16 and portion C is of slightly greater length than portion A. By this arrangement it will be readily apparent that the rear portion of the bed frame may be folded over the forward portion thereof and these portions maintained in substantially parallel spaced relation in the manner shown in Fig. 2, by the intermediate or insert portions B of the side bars 15.

It is preferred that the head, foot and side bars of the frame be formed of the usual angle iron material and that such bars be arranged so that one flange of the angle is horizontal while the other flange is vertical at the outer side of the frame. By this arrangement it will be seen that when the rear portion of the bed is folded over the forward portion as shown in Fig. 2, the top flange of each side bar portion C will come into position in a saddle 10 and since such portions are provided with the bolt apertures 17 for the reception of bolts 11, the folded frame will be securely held in position above and upon the attaching bars 3.

Upon the top of each bar 3 there is secured an angle socket 3' into which a corner of the portion C fits, as shown in Fig. 2, when the frame is folded.

In order to facilitate this swinging of the folded frame into the vertical position in which it is shown in Fig. 2, the head bar 13 is attached to the rear ends of the bars 3 by hinges 18.

In Fig. 2, there is shown and indicated by the numeral 19, a mattress and this is supported upon the frame by a spring structure which is made up of forward and rear fixed units D and E and an intermediate unit F. The rear unit E of the spring structure comprises longitudinally and transversely extending strips of resilient material 20 which are secured between the portions C of the side bars and the foot bar 14. The forward portion D of the spring structure comprises a series of resilient strips 21 which are attached to the head bar 13 and extend toward the rear of the frame and are connected at their rear ends by the cross member 22 which lies forwardly of the forward ends of the side bar portions B. The intermediate portion F of the spring structure is in the form of a sliding frame of rectangular design and indicated by the numeral 23, which lies between the side bars 15 of the frame as shown in Fig. 5. This frame-like portion F of the spring structure includes at its forward side the upper and lower strips 24 and 25, respectively, which are arranged forwardly of the transverse strip 22 of the spring portion D and have the resilient strips 21 slidably secured between them, as is shown in Fig. 6. The side strips of the intermediate spring portion frame are indicated by the numeral 26 and lie beneath the horizontal flanges of the side bars 15 of the frame and are slidably coupled to the portions A by the guide strips 27 which, as shown in Fig. 9, extend across the portions A of the bars between the opposite edges of the strips 26 so as to slidably couple such strips to the frame side bars. Thus it will be seen that the bed frame spring structure which includes the three portions D, E and F, has an intermediate portion which is slidably coupled with the forward portion and as is shown in Fig. 5, this intermediate portion is limited in its rearward movement by the cross-strip 22 of the forward portion and when the intermediate portion is moved to the fullest extent rearwardly, it bridges the space between the opposing ends of the portions A and C of the side rails and extends beneath the intermediate portions B. By this arrangement the spring continuity is substantially unbroken from the head to the foot of the bed when the bed is set up for use and at the same time the sliding intermediate portion of the spring structure functions to reinforce the central part of the bed frame where the hingedly attached inserts B lie.

At the rear or foot end of the bed frame there is attached to each corner by means of a pivot pin or bolt 28, a supporting leg 29, which leg is provided with a bolt hole 30 in the outer side flange thereof which alines with the bolt hole 17 of the adjacent side bar when the leg is folded, so as to receive the securing bolt 11 which secures the bed frame in folded condition.

For the further support of the intermediate portion of the bed frame there is provided the central transverse truss unit indicated generally by the numeral 31. This unit includes the legs 32, each of which is pivotally attached at its upper end to the side strip or bar 26 of the intermediate spring portion F, as indicated at 33 in Fig. 3. These legs are securely braced by the cross-connecting bars or struts 34, so that they will not spread or be twisted out of proper alinement when the bed is in use. As is shown in Fig. 3, the truss unit is connected substantially at the transverse center of the spring portion F and thus when it is in set-up position, it will lie substantially in the plane of the forward transversely spaced pair of the hinges 16.

As will be readily apparent, the central spring unit F, in addition to being made up of a rectangular frame, has the longitudinal and transverse resilient or spring strips 35 which are of lighter material than the material of the frame and coact with the strips 20 and 21 to provide a yielding filler and support for the main frame upon which the mattress 19 is placed.

It is preferred that in the actual construction of the bed structure, the frame and springs be covered with a suitable canvas material, a portion of which is shown in Fig. 5 and indicated by the character M, so as to protect the mattress from contact with the metal parts.

In Fig. 1, the mattress frame or bed frame and spring structure is shown covered by a tent canopy which is generally indicated by the numeral 36. This tent canopy is supported over the bed frame in the following manner. At each forward corner of the frame there is attached to the bar 13, a socket 37 which, when the bed frame is set up for use, is vertically disposed as shown in Fig. 3, and is open at its upper end to receive a tubular post 38. The socket is provided with the longitudinally extending diametrically disposed guide slots 39 in which slidably engage pins 40 carried at the lower ends of the post 38, and there is provided at the upper end of each socket upon the side directed toward the foot or rear end of the bed, the recess 41, Fig. 7, into which the post enters when it is raised in the socket and then swung rearwardly and downwardly to the position in which it is shown in Fig. 7. The foot end of the post, when it is swung down into the folded position, enters an aperture 42 in the wall of the socket opposite the recess 41, so that the post will thus be held in substantially horizontal position or in parallel relation with the adjacent portion of the frame.

Slidably extended into the upper end of each post 38 is a rod 43 and these rods are connected by a horizontal cross-rail 44 so that there is substantially formed a vertically adjustable frame of inverted U-form, the rods 43 forming the downwardly extending legs of such frame. The upper end of each post 38 is split and tapered and provided with screw threads to receive the wing nut 45 which functions when threaded down on the post to secure the legs in adjusted position. Thus there is provided at the forward or head end of the bed frame a substantially rectangular frame which can be placed in vertical position when the bed frame is set up or which can be removed from connection with the corner posts when the bed is to be folded.

Connected with the rail 44 by means of sleeves 46, are the ends of a substantially U-shaped top frame 47 which has the side bars 48 and the cross-bar 49 which connects the side bars. Connected at one end with the central part of the rail 44 by means of a collar 50, is one end of an extensible or two-part ridge pole 51, which is made up of the tubular portion 52 which is connected with the collar 50 and the rod 53 which has an end slidably extended into the tubular portion 52 and which is coupled to the tubular portion by the securing screw 54.

At the foot end of the bed frame there is located an inverted substantially U-shaped frame 55 which has the side legs 56, each of which is pivotally attached to the bed frame by a pivot bolt 28, and a cross-rail 57. This cross-rail has connected thereto the substantially V-shaped frame 60 at the apex of which is formed a socket 61 into which the rear end of the rod 53 engages where it is held by the screw 62. The two frames 55 and 60 which make up the rear end of the tent canvas or canopy supporting frame structure are of slightly less height than the canopy supporting structure at the forward end of the bed frame so that as will be seen upon reference to Fig. 1, when the canvas is in position over the canvas or canopy supporting frame, the greatest height or canopy supporting frame, the greatest height for the interior of the tent will be at the forward end of the bed frame and this height may be increased or decreased as will be readily apparent by raising or lowering the side bars 43 in the corner posts 38.

From the foregoing, it will be readily apparent that when the combination foldable bed frame and tent is set up as illustrated in Fig. 1, it will provide ample protection for at least two persons and will be firmly supported at its forward end by the vehicle bumper attached bars 3 which cooperate with the legs 29 and 32 for maintaining the bed frame horizontal. When the structure is to be dismantled or taken down for folding, the frame 47 together with the elements 43, 48 and 52 will be detached from the corner posts 38 and the ridge pole bar 53 will, of course, be disconnected from the socket 61. The frames 55 and 60 are then folded down on the mattress 12 and the posts 38 are shifted longitudinally and then swung forwardly in the sockets 37 to lie on top of the mattress 12 at the forward end of the bed. The frame can then be folded with the outer or foot portion turned in over the mattress, thus folding the mattress on itself, as shown in Fig. 2, the intermediate portions B of the side bars 15 of the frame providing the necessary "break" in the side bars to permit the inner and outer portions of the bed frame to be brought into the desired spaced relation. The entire folded structure is then swung upwardly and forwardly on the hinges 18 so as to bring the portions C of the side bars into the saddles 10 which the brace arms 9 carry to facilitate securing these portions of the side bars to the saddles in the manner shown by the use of the bolts 11. In this manner the folded structure will be firmly secured and supported by and upon the rigid supporting bars 3, which are attached to the vehicle bumper and extend rearwardly therefrom and any suitable water-proof covering or other protection may then be placed over the folded bed structure to shield the same while it is being transported.

What is claimed is:

1. A foldable bed frame and spring of the character stated, comprising an elongated rectangular frame, a mattress supporting spring structure within the frame, said frame being divided transversely through two planes to provide front, rear and intermediate portions, the front and rear portions being hingedly coupled to the intermediate portion whereby said front and rear portions may be folded into spaced parallel relation, and said spring structure being divided into front, rear and intermediate sections, the front and intermediate sections being joined to said front frame portion and the rear section being joined to the rear frame portion, and said intermediate spring section being shiftable on the front portion to an operative position across the intermediate frame portion and to an inoperative position from beneath the intermediate frame portion for the folding of the portions into the stated relation.

2. A foldable bed frame and spring of the character stated, comprising an elongated rectangular frame, a mattress supporting spring structure within the frame, said frame being divided transversely through two planes to provide front, rear and intermediate portions, the front and rear portions being hingedly coupled to the intermediate portions whereby said front and rear portions may be folded into spaced parallel relation, and said spring structure being divided into three sections to facilitate the folding of the portions into the stated relation, one of said spring sections being of a width to extend across said frame intermediate portion, means joining the said one spring section with one of the frame portions adjacent the intermediate portion to support the one spring section for movement into or out of bridging relation between the other two sections for respectively setting up the bed frame for use or for folding the same.

3. A foldable bed structure for attachment to and partial support by a motor vehicle bumper, comprising a rectangular frame having transverse head and foot bars and longitudinal side bars, said side bars being transversely divided in two planes to form forward, intermediate and rear portions, hinges coupling said intermediate portions with the forward and rear portions whereby the foot bar and attached rear portions may be folded into parallel relation with and over the head bar and the forward portions, with the intermediate portions disposed transversely of the attached forward and rear portions, a pair of arms each hingedly attached to the head bar and extending forwardly therefrom, a vehicle bumper engaging claw at the other end of each arm for securing the arm to the bumper for the extension of the arm rigidly rearwardly from the bumper, supporting legs pivotally attached to the rear portion of the bed which includes the foot bar and the adjacent side bar portions, leg members pivotally coupled with the bed structure adjacent the transverse center thereof, a spring structure carried by the frame including a forward section, an intermediate section and a rear section, a coupling between the sides of the intermediate section and the forward portion of the frame for facilitating shifting the intermediate section in the plane of the frame with respect to the other sections to bridge the intermediate portions of the side bars of the frame when the frame is set up for use.

4. A foldable bed structure, comprising a rectangular frame having transverse end bars and parallel side bars, said side bars being divided transversely in two planes whereby the said side bars are divided into forward, intermediate and rear portions, said intermediate portions being materially shorter than the forward and rear portions, hinges coupling the ends of the intermediate portions with the adjacent ends of the front and rear portions whereby the front and rear portions may be folded into spaced parallel relation, a spring structure forming a part of the frame including forward, intermediate and rear sections, the forward section of the spring structure including a number of longitudinally extending strips and a cross-connecting strip spaced from the adjacent transverse end bar, the intermediate section of the spring structure being in the form of a rectangular frame having side strips in parallel relation with and slidably coupled with the forward portions of the frame side bars, said intermediate section of the spring further having a transverse strip slidably coupled with the longitudinal strips of the forward spring section whereby the said intermediate spring section may be shifted forwardly on the said forward spring section, the said frame of the intermediate section of the spring being movable to a position where the side strips thereof extend across the hinge connections between the intermediate portions of the side bars and the forward and rear portions thereof when the frame is set up for use, means for hingedly coupling the forward end of the frame to a fixed support whereby the folded portions may be swung on a pivot extending transversely of the frame, and supporting legs connected with the frame.

5. A foldable bed structure and means for attaching the same to a vehicle bumper, comprising a rectangular frame formed in three portions, hinge connecting means between said portions facilitating folding the frame by relatively moving the frame portions upon two axes extending transversely of the frame to bring the front and rear portions into overlapping spaced relation, a bedding supporting spring for and secured in the frame and constructed to permit said folding of the frame a pair of coupling and supporting arms each having hinge connection between one end and the forward portion of the frame, a head member formed at the other end of each of said arms and including a reversely bent hook adapted to engage over the vehicle bumper, means carried by each of the arms and coacting with the adjacent hook for securing the latter in operative connection with the bumper whereby the arms will extend rigidly rearwardly from the bumper to function as a supporting means for the forward end of the bed frame, said supporting arms being of a length greater than the thickness of the frame structure when folded whereby the folded structure may be moved to a vertical position above the arms, supporting legs connected with the bed structure for supporting the same in cooperation with the bumper attached arms and means for rigidly coupling the folded frame structure to the arms.

6. A foldable bed structure for attachment to and support by a bar such as a vehicle bumper, comprising a rectangular bed frame having front and rear transverse bars and parallel side bars, the side bars being divided along two parallel planes whereby the frame is divided into forward, intermediate and rear portions, hinge connecting means between the forward, intermediate and rear portions whereby the forward and rear portions may be disposed in spaced parallel relation and the intermediate portions disposed to extend perpendicularly to the spaced forward and rear portions, a foldable mattress supporting means carried by the frame, a pair of attaching and supporting bars each hingedly attached to the front bar of the frame, each of said attaching bars including a jaw member for detachable connection with the bumper bar and a locking means for maintaining the jaw member in engagement with the bumper bar, a brace arm secured to and extending upwardly from each attaching bar, a saddle carried upon the upper end of each brace arm for receiving a side bar of the rear portion of the frame when the frame is in folded condition and disposed vertically over the attaching bars, and means for securing said saddles to the portions of the frame side bars disposed therein, and supporting legs connected to the frame for coaction with the jaw carrying bars for the support of the frame.

7. A foldable bed frame and spring structure of the character described, comprising an elongated rectangular frame, a mattress supporting spring structure within the frame, said frame being divided transversely through two planes to provide front, rear and intermediate portions, the front and rear portions being hingedly coupled to the intermediate portion whereby said front and rear portions may be folded into spaced parallel relation, and said spring structure being divided into front, rear and intermediate sections, the front and intermediate sections being joined to the front frame portion and the rear section being joined to the rear frame portion, said intermediate spring section being supported by and slidable on and longitudinally of the front spring section and the front frame portion and when slidably moved toward the intermediate frame portion extending across such intermediate frame portion to operatively connect the front and rear spring sections together.

8. A foldable bed frame and spring structure of the character stated, comprising an elongated rectangular frame, a mattress supporting spring structure within the frame, said frame being divided transversely through two planes to provide front, rear and intermediate portions, the front and rear portions being hingedly coupled to the intermediate portion whereby said front and rear portions may be folded into spaced parallel relation, and said spring structure being divided into front, rear and intermediate sections, the front and rear sections being attached to the front and rear frame portions, the front spring section consisting of a plurality of resilient strips extending longitudinally of the frame structure and a transverse strip joining the longitudinal strips together at the ends remote from the forward end of the front frame portion, the said intermediate spring section having longitudinally extending side bars disposed adjacent to the sides of the front frame portion and transversely extending bars connecting the side bars, one of said transverse bars being disposed across the longitudinal strips of the front section, means slidably connecting the said one of the transverse bars with said strips, means slidably coupling the side bars of the intermediate spring section with the sides of the front frame portion, the said intermediate spring section being shiftable rearwardly in the frame to a position across the intermediate portion of the frame to operatively connect the front and rear spring sections.

THOMAS THOMPSON.